(No Model.)

T. LINKE.
SELF CLEANING LIQUID FILTER.

No. 560,511. Patented May 19, 1896.

WITNESSES:
William P. Goebel.
O. H. Lee.

INVENTOR
Theodore Linke
By Adam E. Schatz
ATTORNEY.

UNITED STATES PATENT OFFICE.

THEODORE LINKE, OF NEW YORK, N. Y.

SELF-CLEANING LIQUID-FILTER.

SPECIFICATION forming part of Letters Patent No. 560,511, dated May 19, 1896.

Application filed August 29, 1895. Serial No. 560,848. (No model.)

*To all whom it may concern:*

Be it known that I, THEODORE LINKE, a citizen of the United States, and a resident of New York city, county and State of New York, have invented a new and useful Improvement in Self-Cleaning Liquid-Filters, of which the following is a specification.

My invention relates to that class of filters in which the water is passed through artificial or natural stone filtering medium which is incased in a metal barrel and in which the water may be passed through the filtering medium or may be caused to flow around it, in order that large quantities of unfiltered water may be drawn without removing the filter.

The object of this present invention is to provide an improved device of this kind through which filtered or unfiltered water in great quantities may be drawn by reason of the large surface of filtering medium which may be employed.

Another and the chief object of my present invention is to produce a filter of this type having improved self-cleaning means. I have found by experience that the impurities held in the water, when forced against the filtering-stone or other medium of the ordinary devices of this class, are apt to lodge there and thus retard the filtering of water. It becomes necessary to remove the filtering medium and cleanse the same. My invention is designed to avoid the necessity of such removal by providing for cleaning the filter without removing any part of it. This desirable object I obtain by locating in a convenient manner, between the filtering medium and the barrel, a scraper which scrapes the face of the filtering medium when the latter is rotated. When the filtering medium is revolved by means provided for the purpose, the impurities which have lodged on its face are scraped off and pass out when the filter permits the passage of unfiltered water.

To these ends my invention consists in the construction and combination of parts substantially as hereinafter described and claimed.

Figure 1:
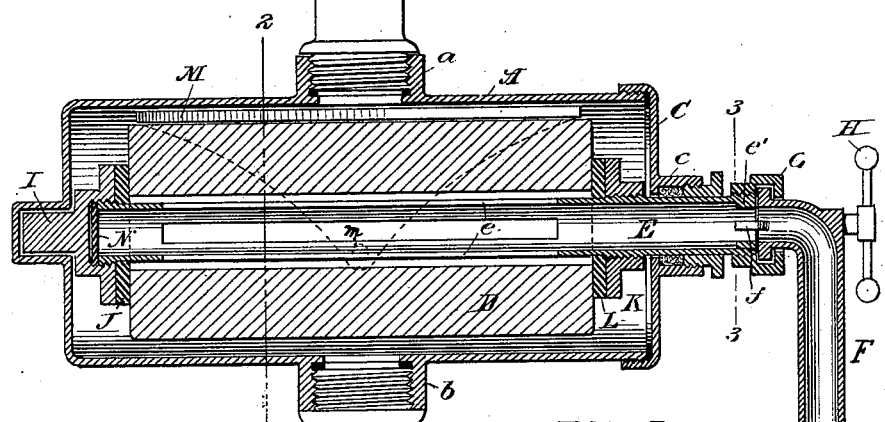
Figure 4:
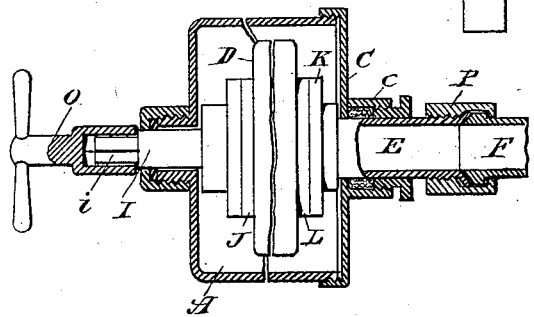
Figure 2:
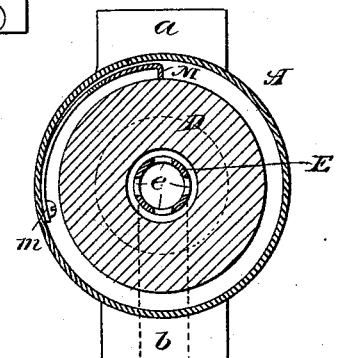
Figure 3:
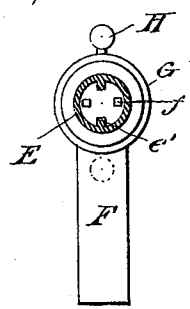

In the accompanying drawings, Figure 1 is a longitudinal section of a filter embodying my improvements and attached to a faucet. Fig. 2 is a section on line 2 2 of Fig. 1. Fig. 3 is a section on line 3 3 of Fig. 1. Fig. 4 is a detail longitudinal section of the casing, illustrating a modification, the central portion of the casing and stone being broken out to shorten the figure.

In all the figures the same reference-characters are used to designate the same parts.

Referring first to Figs. 1, 2, and 3, A represents the barrel or casing having one end fixed, preferably cast thereon, and the other end removable. The fixed end is provided with a socket to receive the end or spindle I of the tube upon which the filtering-stone is secured. The adjustable end or cap C is secured by a screw-thread and is provided with a stuffing-box $c$, through which the tube E passes to carry off filtered water. At opposite sides of about its center the barrel is provided with nipples or necks $a$ and $b$, one for attaching the same to the faucet and the other to receive the outlet-cock B for unfiltered water.

The filtering medium is preferably a tube of porous natural stone D, through which is passed a metallic pipe E, having slots or perforations $e$ along its side, to enable the filtered water to flow through and pass off through the cock or outlet F. After the stone tube is passed over the pipe the same is fixed in position by means of a shouldered nut K, screwed on the pipe, a washer L being interposed between said nut and stone and a washer J being interposed between the stone and the shoulder of the spindle I, which latter fits in the recess of the fixed end of the barrel.

The projecting end of the pipe is provided with internal lugs $e'$, and a suitable coupling or stuffing-box G clamps thereto one end of the bent outlet-pipe F, which has a lug $f$ projecting between the lugs $e'$. To the pipe F is affixed a wheel H in line with the center or axis of the pipe E, and by means of this wheel the pipe F is rotated, which causes the lug $f$ to engage one of the lugs $e'$ and rotate the pipe E and the stone for the purpose of scraping off any impurities that may be on the stone by the aid of the scraper N. This scraper is preferably made of thin but flexible metal of the shape of the letter V. The same is bent to conform to the stone, and is fastened at the apex $m$ on the interior of the barrel, and the other end is bent sharply inward to bring the edge against the filter. This edge covers the entire length of the stone. A washer N is placed at the end of the pipe E to prevent escape of filtered water at that end.

When it is desired to clean the filtering medium, it is only necessary to turn the wheel H. When the faucet is opened to draw unfiltered water, it is only necessary to open the cock B, and when filtered water is to be drawn the cock will be closed and the water is forced through the filtering medium and through the openings in the pipe and out through the outlet-pipe F into any suitable receptacle.

Instead of affixing the hand-wheel H as above described I may extend the spindle I through the end of the casing or barrel, as shown in Fig. 4, and provide it with a squared end $i$ to receive a turning key or wrench O. With this construction the lugs $f$ and $e'$ are dispensed with and a plain stuffing-box P is used in place of the coupling G.

Having now described my invention, what I claim is—

1. The combination with the casing A, of the perforated pipe E carrying the filtering medium D and mounted to rotate in said casing, and the flexible scraper M consisting of a V-shaped sheet of flexible metal having its apex attached to the casing and having an inward bent free edge bearing on the said medium, substantially as described.

2. The combination with the casing A having a bearing-recess at one end and a cap having a stuffing-box at the other end, of the shouldered spindle I fitting said recess, the perforated pipe E secured at one end to said spindle and extending through the said stuffing-box, and having lugs $e'$ the filter D secured on said pipe, a scraper in the space between the casing and filter, the bent outlet-pipe F having lug $f$ and hand-wheel H, and the coupling G connecting the pipe F with the pipe E, substantially as described.

In testimony that I claim the foregoing as my invention I have signed my name, in presence of two witnesses, this 16th day of August, 1895.

THEODORE LINKE.

Witnesses:
FRANCIS A. CAMPBELL,
CLAUDE J. RICH.